(12) United States Patent
Amundson

(10) Patent No.: US 9,765,960 B2
(45) Date of Patent: Sep. 19, 2017

(54) INSIDE CORNER TRIM PRODUCT

(71) Applicant: Gregory A. Amundson, Scandia, MN (US)

(72) Inventor: Gregory A. Amundson, Scandia, MN (US)

(*) Notice: Subject to any disclaimer, the term of this patent is extended or adjusted under 35 U.S.C. 154(b) by 0 days.

(21) Appl. No.: 14/983,979

(22) Filed: Dec. 30, 2015

(65) Prior Publication Data
US 2017/0059149 A1 Mar. 2, 2017

Related U.S. Application Data

(60) Provisional application No. 62/212,230, filed on Aug. 31, 2015.

(51) Int. Cl.
*H02G 3/04* (2006.01)
*H02G 3/30* (2006.01)
(Continued)

(52) U.S. Cl.
CPC ............ *F21V 33/006* (2013.01); *E04F 19/02* (2013.01); *E04F 19/061* (2013.01); *G02B 6/0005* (2013.01); *E04F 19/022* (2013.01); *E04F 19/045* (2013.01); *E04F 19/0459* (2013.01); *E04F 2019/0404* (2013.01); *E04F 2019/044* (2013.01); *E04F 2019/0427* (2013.01); *E04F 2019/0454* (2013.01); *F21Y 2115/10* (2016.08); *H01B 7/40* (2013.01); *H02G 3/04* (2013.01); *H02G 3/045* (2013.01); *H02G 3/0406* (2013.01); *H02G 3/0487* (2013.01); *H02G 3/26* (2013.01); *H02G 3/263* (2013.01); *Y10T 428/13* (2015.01); *Y10T 428/139* (2015.01);
(Continued)

(58) Field of Classification Search
None
See application file for complete search history.

(56) References Cited

U.S. PATENT DOCUMENTS 2,303,864 A * 12/1942 Reasor .................. A47K 3/008
277/637
2,831,049 A    4/1958 Cabral
(Continued)

FOREIGN PATENT DOCUMENTS

CN    201787064 U     4/2011
DE       2501580 A *  7/1976 ........... H02G 3/0487
(Continued)

OTHER PUBLICATIONS

Magic American ½ in. ×16 Ft. Counter Trim (CT306T) from the HomeDepot, 3 pages, Jan. 11, 2012.
(Continued)

*Primary Examiner* — Jeff Vonch
(74) *Attorney, Agent, or Firm* — Patterson Thuente Pedersen, P.A.

(57) ABSTRACT

A flexible inside corner trim piece is formed with concave depressions at hinge portions where wings attach to the body. The trim piece can be formed such that wings and a top cap lay flat in plane perpendicular to body or wings and top cap curve at an angle. Hinge portions can be narrow or wide and symmetrical or asymmetrical. The trim piece can be dyed, paintable, or present another decorative surface. The trim piece can include embedded lighting.

14 Claims, 8 Drawing Sheets

(51) Int. Cl.
*H01B 7/40* (2006.01)
*E04F 19/02* (2006.01)
*E04F 19/04* (2006.01)
*F21V 8/00* (2006.01)
*F21V 33/00* (2006.01)
*E04F 19/06* (2006.01)
*F21Y 115/10* (2016.01)
*H02G 3/00* (2006.01)

(52) U.S. Cl.
CPC .......... *Y10T 428/24314* (2015.01); *Y10T 428/24479* (2015.01); *Y10T 428/24488* (2015.01); *Y10T 428/24744* (2015.01)

(56) References Cited

U.S. PATENT DOCUMENTS

| | | | |
|---|---|---|---|
| 3,029,303 A | 4/1962 | Severino | |
| 3,200,547 A | 8/1965 | Johnson | |
| 3,216,164 A * | 11/1965 | Stillman | E04F 19/045 277/637 |
| 4,246,303 A | 1/1981 | Townsend | |
| 4,404,425 A | 9/1983 | Rich | |
| 4,530,865 A * | 7/1985 | Sprenger | E04F 19/04 138/111 |
| 4,629,648 A | 12/1986 | Minick | |
| 4,644,099 A * | 2/1987 | Basconi | H01B 7/0823 174/115 |
| 4,670,959 A | 6/1987 | Rosen | |
| 4,796,348 A | 1/1989 | Rosen | |
| 4,801,764 A | 1/1989 | Ohlhaber | |
| 4,829,730 A | 5/1989 | Zeilinger | |
| 5,526,619 A | 6/1996 | Vadeges | |
| 5,730,446 A | 3/1998 | Taylor | |
| 5,810,406 A | 9/1998 | Reid, Jr. et al. | |
| 6,259,843 B1 * | 7/2001 | Kondo | G02B 6/4403 174/104 |
| 6,332,479 B1 | 12/2001 | Ko | |
| 6,476,323 B2 | 11/2002 | Beebe et al. | |
| 7,118,791 B2 | 10/2006 | Martel | |
| 2003/0175482 A1 * | 9/2003 | Porter | A47K 3/008 428/172 |
| 2004/0087739 A1 | 5/2004 | Onder | |
| 2007/0138349 A1 * | 6/2007 | Ayoub | F16L 3/26 248/58 |
| 2008/0125532 A1 | 5/2008 | Nelson | |
| 2008/0149362 A1 * | 6/2008 | Ruddick | H02G 3/0418 174/68.3 |
| 2009/0294016 A1 | 12/2009 | Sayres et al. | |
| 2011/0020580 A1 | 1/2011 | Amundson | |
| 2013/0052424 A1 | 2/2013 | Amundson | |
| 2013/0196113 A1 | 8/2013 | Amundson | |
| 2013/0266760 A1 | 10/2013 | Amundson | |
| 2014/0093689 A1 | 4/2014 | Amundson | |

FOREIGN PATENT DOCUMENTS

| | | | |
|---|---|---|---|
| DE | 10 2007 015 894 A1 | 10/2008 | |
| EP | 0134455 A1 | 3/1985 | |
| EP | 1516971 A2 * | 3/2005 | A47K 3/008 |
| EP | 1700971 A2 * | 9/2006 | E04F 19/045 |
| EP | 2 082 674 A1 | 7/2009 | |
| EP | 2671489 A2 * | 12/2013 | A47K 3/008 |
| FR | 2565023 A1 * | 11/1985 | H01B 7/0815 |
| FR | 2 568 730 | 2/1986 | |
| GB | 2022670 A * | 12/1979 | E06B 3/6205 |
| GB | 2182984 A * | 5/1987 | E04F 19/045 |
| GB | 2 301 153 A | 11/1996 | |
| GB | 2337565 A * | 11/1999 | A47K 3/008 |
| GB | 2 352 867 A | 2/2001 | |
| GB | 2 444 089 A | 5/2008 | |
| JP | 2006-121881 | 5/2006 | |
| WO | WO 2015075220 A1 * | 5/2015 | E04F 19/045 |

OTHER PUBLICATIONS

Reimer et al., Bio-sense or Nonsense, Aug. 2008, 4 pages.
Machine translation of CN 201787064, Jul. 24, 2014.
Machine translation of DE 10 2007 015 894, Sep. 16, 2015.
Machine translation of FR 2 568 730, Sep. 16, 2015.
Machine translation of JP2006121881, May 2006.
Application and File History for U.S. Appl. No. 13/632,447, filed Oct. 1, 2012. Inventor: Gregory A. Amundson.
Application and File History for U.S. Appl. No. 13/872,823, filed Apr. 29, 2013. Inventor: Gregory A. Amundson.

* cited by examiner

INSIDE CORNER TRIM PRODUCT

RELATED APPLICATION

This application claims the benefit of U.S. Provisional Application No. 62/212,230, filed Aug. 31, 2015, entitled "Inside Corner Trim Product", which is hereby incorporated herein in its entirety by reference.

FIELD OF THE INVENTION

The present invention generally relates to building products, and more particularly to flexible corner trim material for application to inside corners for decorative and cosmetic applications.

BACKGROUND OF THE INVENTION

In construction of dwellings and other buildings, inside corners are finished in a variety of ways. Depending on the wall material, inside corners may be created by abutting finishing materials. This can be sufficient in many cases if the structural materials at the corner are perfectly plumb and straight. However, many building materials and construction techniques are less than perfect. More commonly corners are not plumb and straight and further finishing is required or desirable. In the case of drywall construction, sheets of drywall are abutted at the inside corners and the joints are sealed with tape which is then concealed with drywall joint compound. When paneling is used cove molding may be applied at the inside corners to conceal the joints. However, these approaches are time consuming and may still not provide a desired appearance at the inside corners because of unevenness of the resulting walls.

Cove molding is made from relatively rigid materials and does not readily conform to wall surfaces that are less than regular. Drywall taping requires considerable skill and practice to achieve a pleasing appearance.

SUMMARY OF THE INVENTION

The invention solves many of the above discussed problems and presents a useful alternative way to finish inside corners. Corners finished with embodiments of the invention tend to soften the appearance of the room, provide a smoother transition between walls and be more cosmetically pleasing than corners finished by other techniques.

In example embodiments, an inside corner trim piece can unitary in structure. An inside corner trim piece extruded or molded of a flexible material and can include a body and wings. Each wing is connected to the body at a hinge portion. The hinge portion between the wings and the body can present a longitudinal concave depression allowing for greater flexibility of the wings and better conformance to irregularities in materials at a corner.

In an example embodiment, the longitudinal concave depression at the hinge portion can have a wider or narrower extent as compared to and may feature an approximately semicircular cross section or a cross section having an arcuate shape. The longitudinal depression may also have an angular shape. The longitudinal concave depression of the hinge portion may have a radius of curvature that is about 10/7 or approximately alternately from about 1.4 to about 6 times as great as the thickness of the material of the hinge portion. For example, if the thinnest area of the hinge portion is about 0.007 inches thick the radius of curvature of the concave depression, viewed in cross section may range from about 0.010 inches to about 0.060 inches. "About" in this context means with a tolerance of plus or minus 0.005 inches.

In example embodiments, when viewed in cross section the wings and top of the body lay flat when the corner trim piece is in a relaxed state and not applied to an inside corner. According to another example embodiment, the wings and top of the body define a concave arc or curve such that wings are angled away from a plane perpendicular to a line that bisects the body into mirror images when viewed in cross section.

According to another example embodiment, the trim piece can be dyed, paintable, can be prepainted or present a wood trim appearance. In another example embodiment, the trim piece can present or include embedded lighting, for example, in the form of light emitting diodes. According to another example embodiment, the trim piece includes fiber optics related to the embedded lighting and/or low voltage wiring to support the wiring.

According to another example embodiment, the trim piece can present a lengthwise slit to provide access to a lengthwise passage or cavity in the trim piece. The passage or cavity may have a circular, oval, elliptical or other shaped cross section.

BRIEF DESCRIPTION OF THE DRAWINGS

Embodiments may be more completely understood in consideration of the following detailed description in connection with the accompanying drawings, in which.

DETAILED DESCRIPTION

Figure 1:
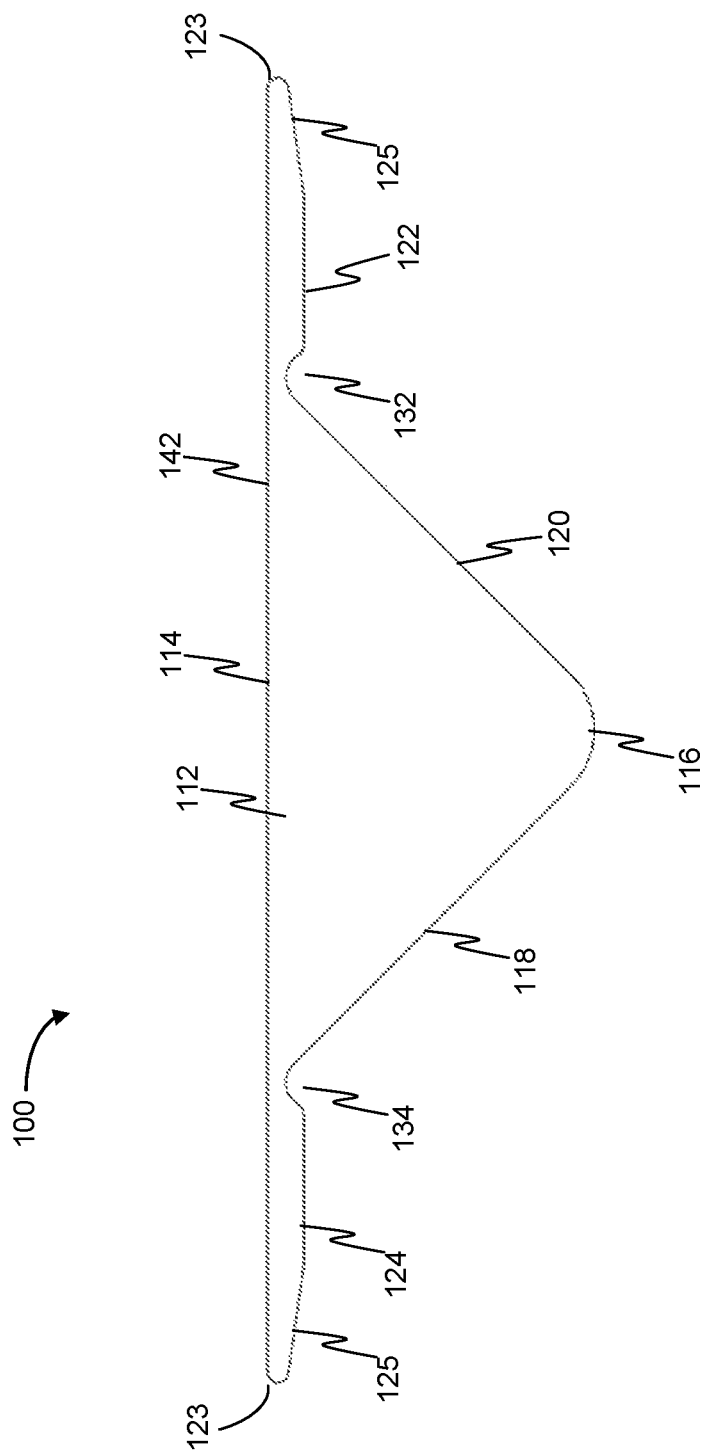
FIG. 1 is a cross-sectional view of a trim piece according to an example embodiment of the invention.

Referring to FIG. 1 an example embodiment of the invention is depicted. FIG. 1 depicts a cross-sectional view of a trim piece 100. Trim piece 100 is of indeterminate length and can be extruded to any desired length. As depicted, trim piece 100 is a unitary structure formed of a flexible substance such as a polymer. Example polymers that can be used are disclosed in U.S. Patent Application 2013/0266760 A1 which is incorporated by reference herein.

When viewed in cross-section, trim piece 100 according to an example embodiment generally presents body 112, top cap 114, junction 116, first side 118, second side 120, and wings 122 and 124.

Body 112 has a generally triangular cross section with a rounded corner at junction 116. According to an example embodiment, junction 116 presents a radius of curvature of about 0.030 inches.

First side 118 and second side 120 are generally mirror images of each other and may include or be adapted to receive an adhesive (not shown) thereon to facilitate attachment of trim piece 100 to an inside corner.

Wings 120 and 122, when viewed in cross section, extend outwardly away from body 112 in opposing directions. Wings 120 and 122 are generally mirror images of one another and further present rounded tip 123 and tapered portion 125.

Trim piece 100, when viewed in cross-section, can span a width of 0.5 to three inches between the tip of wing 122 and wing 124. Trim piece 100 can span other widths as desired for a particular finishing circumstance.

In the depicted embodiment, in FIGS. 1-6, first side 118 and second side 120 form an approximately 90 degree angle at junction 116. In other example embodiments, this angle can be more obtuse or more acute to facilitate use in environments where walls do not meet at 90 degree angles. Junction 116 can present a sharp corner or be rounded when viewed in cross section.

Wings 122 and 124 are arranged at opposite sides of body 112, and extend outwardly away from body 112 and can taper to terminate at narrow or a substantially knife edges. Wings 122 and 124 can taper along their entire span or over only a portion. Wings 122 and 124 are connected to body 112 at hinge portions 132, 134. When viewed in cross-section, hinge portions 132 and 134 can present approximately semi-circular, arcuate or curved concave indentations in body 112 on a side opposite top cap 114. The indentations of hinge portions 132 and 134 can have alternative shapes such as rectangular or triangular, and can be arranged on the same side of body 112 as top cap 114 as well as on the opposite side as depicted. Hinge portions 132 and 134 are bordered by a trough shaped depression that can have a radius of curvature of 0.01 inches or be larger or smaller as desired.

In the example embodiments depicted in FIGS. 1-4, hinge portions 132 and 134 are relatively narrow and non-symmetrical as extensions of sides 118 and 120. In the example embodiment depicted in FIGS. 5-6, hinge portions 132 and 134 are relatively wide and symmetrical. Width and symmetricality may vary independent of each other as well.

Figure 2:
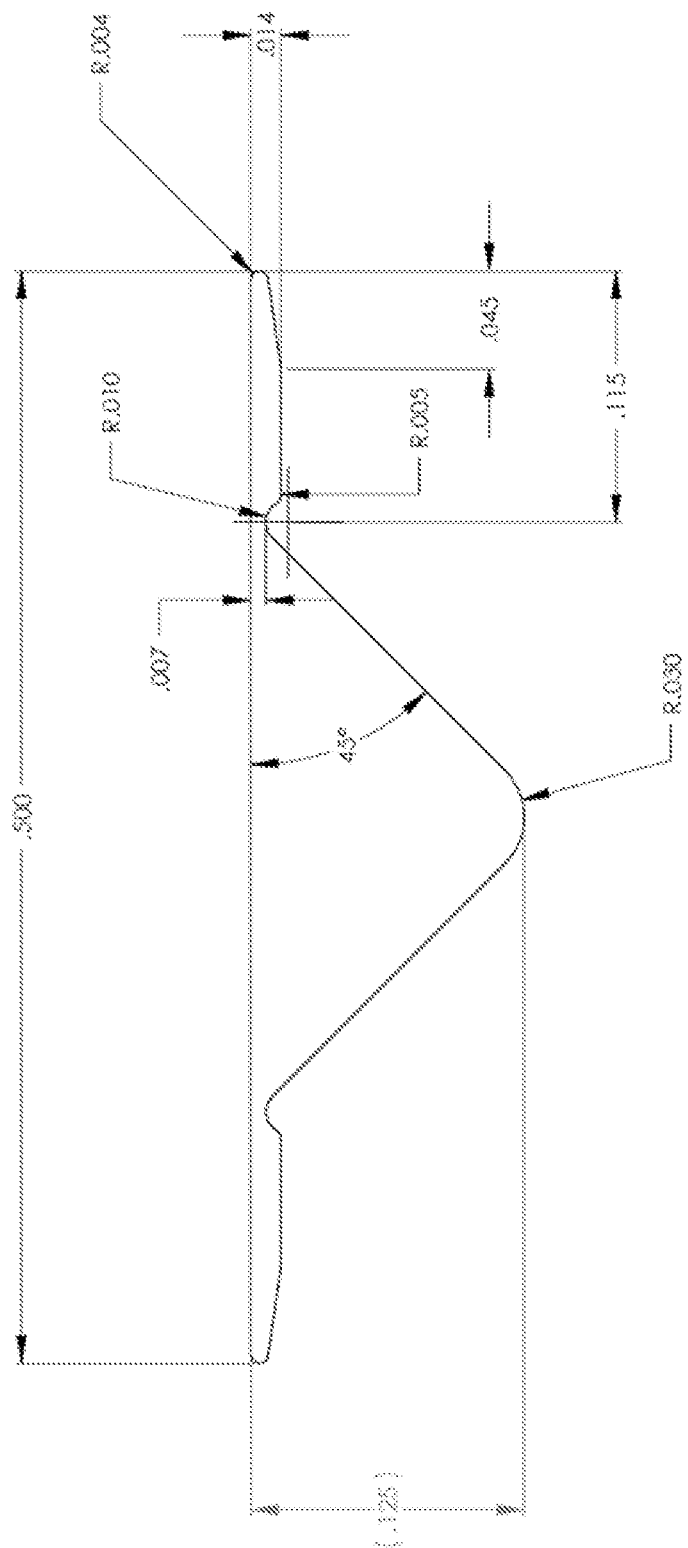
FIG. 2 is a cross-sectional view of a trim piece according to the embodiment of FIG. 1 including example dimensions in inches and degrees.
Figure 3:
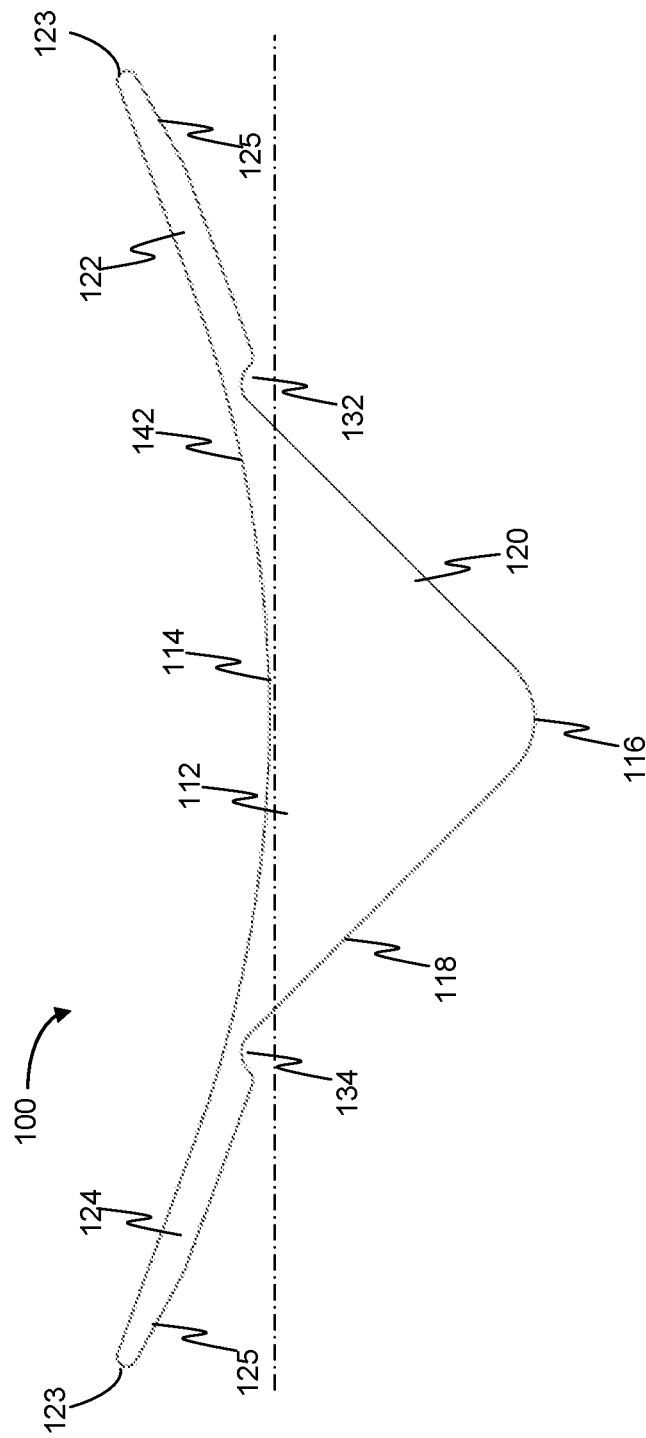
FIG. 3 is a cross-sectional view of a trim piece according to another example embodiment of the invention.
Figure 4:
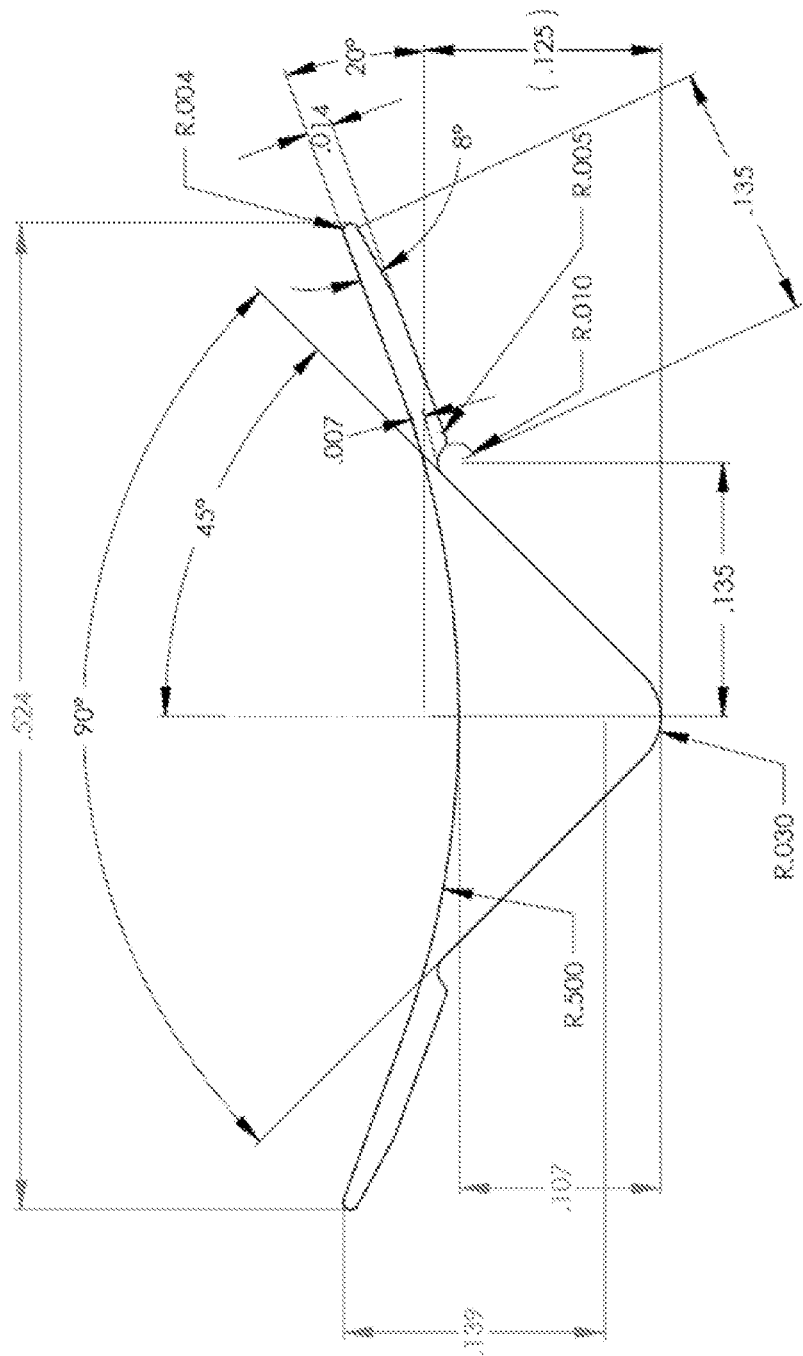
FIG. 4 is a cross-sectional view of a trim piece according to the embodiment of FIG. 3 including example dimensions in inches and degrees.
Figure 5:
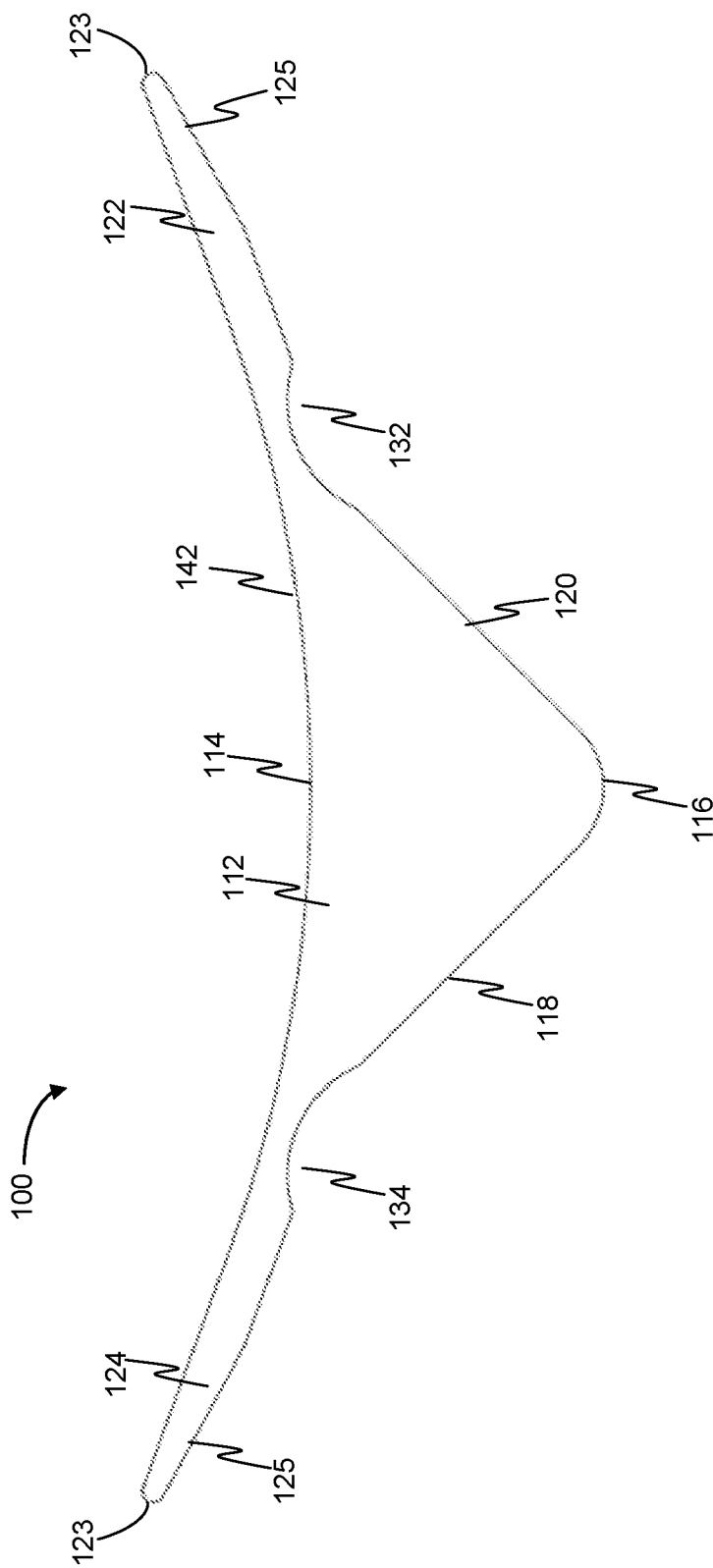
FIG. 5 is a cross-sectional view of a trim piece according to another example embodiment of the invention.
Figure 6:
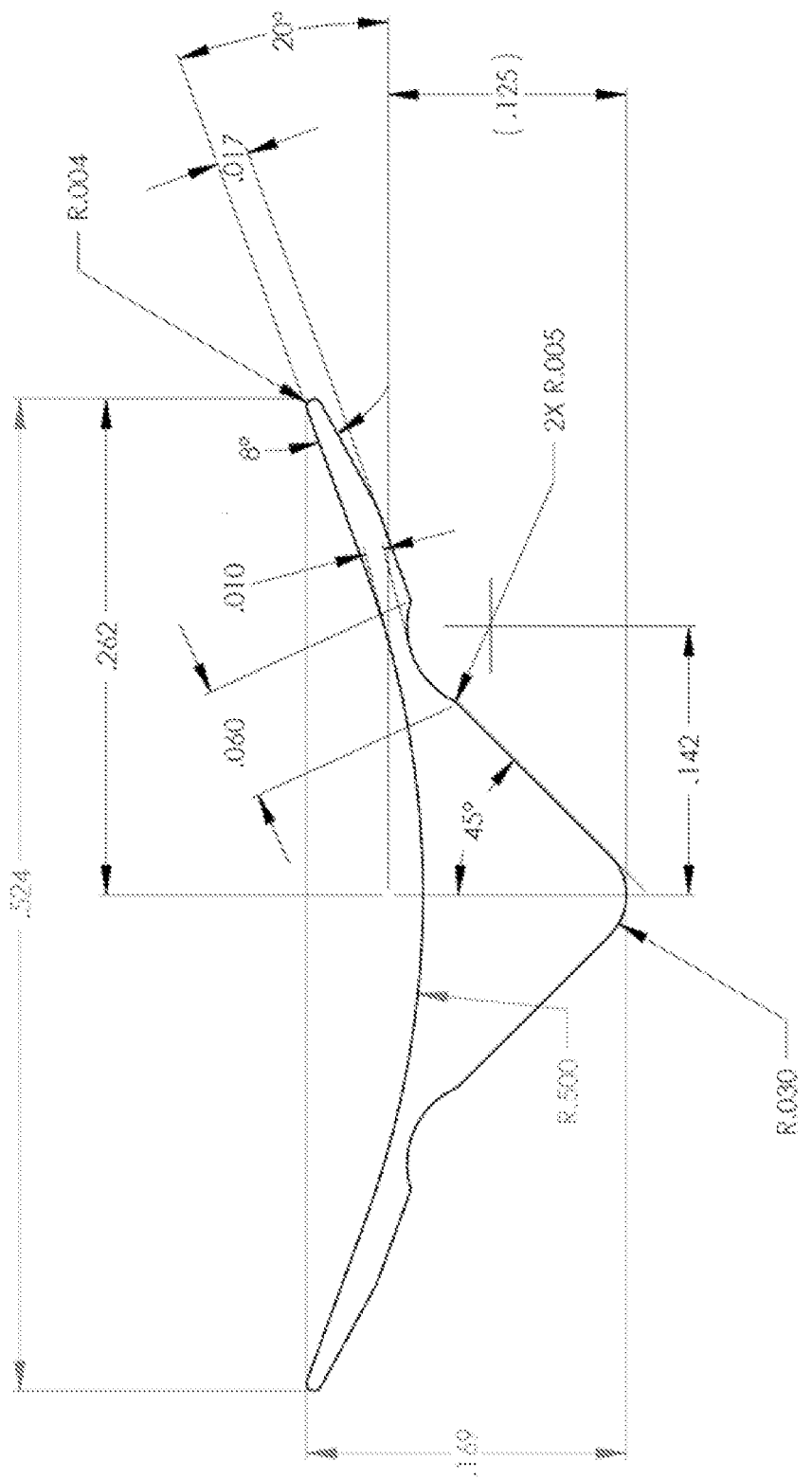
FIG. 6 is a cross-sectional view of a trim piece according to the embodiment of FIG. 5 including example dimensions in inches and degrees.

In the example embodiment depicted in FIGS. 1 and 2, top cap 114 and wings 122 and 124 lie substantially on a plane that is perpendicular to a line bisecting body 112 at junction 116. In other embodiments, such as those depicted in FIGS. 3-6, top cap 114 is curved or arcuate and wings 122 and 124 can lie at an angle of twenty degrees plus or minus ten degrees from the plane that is perpendicular to a line bisecting body 112 at junction 116.

Figure 7:
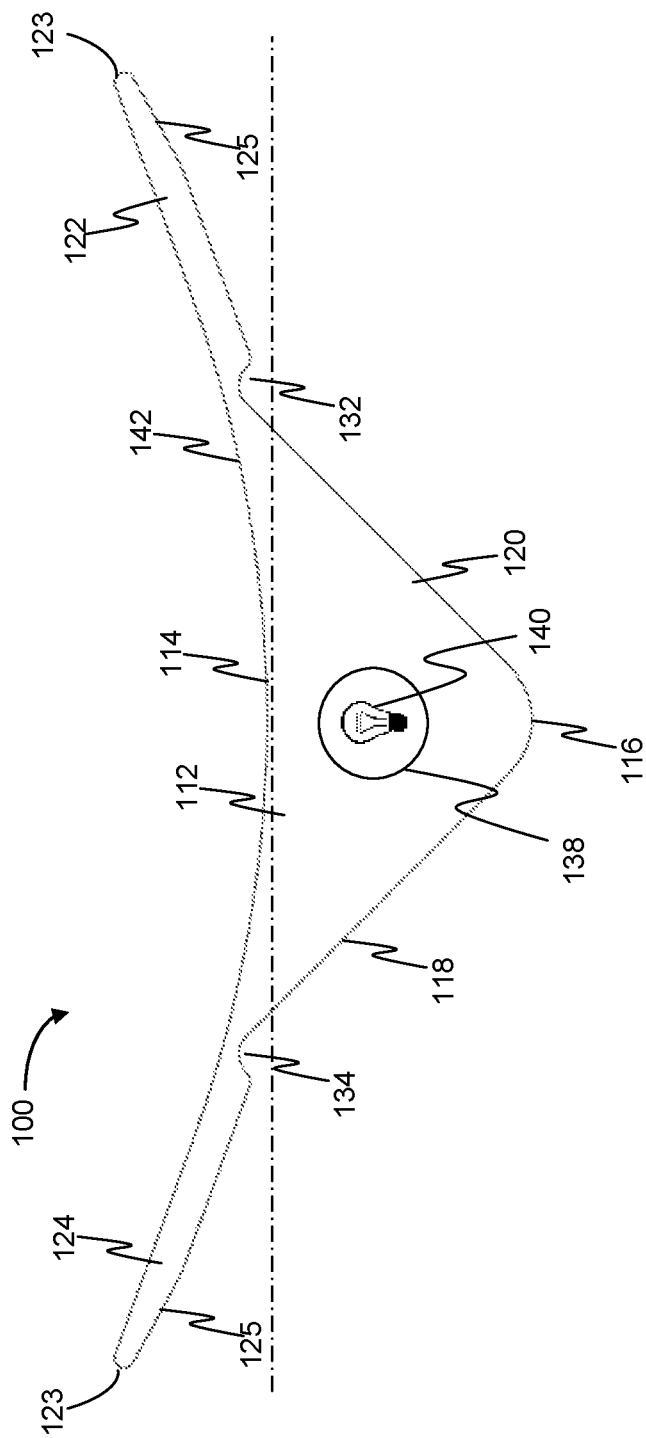
FIG. 7 is a cross-sectional view of a trim piece including illumination according to another example embodiment of the invention and FIG. 8 is a cross-sectional view of a trim piece including a slit access to an internal cavity.

Referring to FIG. 7, trim piece 100 can include illumination 138, for example, LEDs 140. The LEDs can be incorporated into trim piece 100 during the extrusion process, or applied to top cap 114 or embedded after extrusion. Trim piece 100 can present wiring or connectors (not shown) as needed to supply power to any included lights. Trim piece 100 can also include fiber optic therein to transmit light to other locations within trim piece 100.

Trim piece 100 can be composed of a single multiple density extruded PVC, TPO, bio-based polymer, EcoFlex, Elvax, or similar product having sufficient rigidity and flexibility to form trim piece 100.

Trim piece 100 can present a decorative surface 142 that causes trim piece 100 to match or contrast with the surfaces abutting the corner to which it is mated. The decorative surface 142 can be present on the outside of body 112 or top cap 114, or color or texture can be integrated throughout trim piece 100, for example, by forming trim piece 100 of pigmented materials. The decorative surface 142 can be paintable, colored to match desired paint colors, wood trim, metallic, or other desired surface. Trim piece 100 can present adhesive on first side 118 and second side 120 opposite top cap 114.

Figure 8:
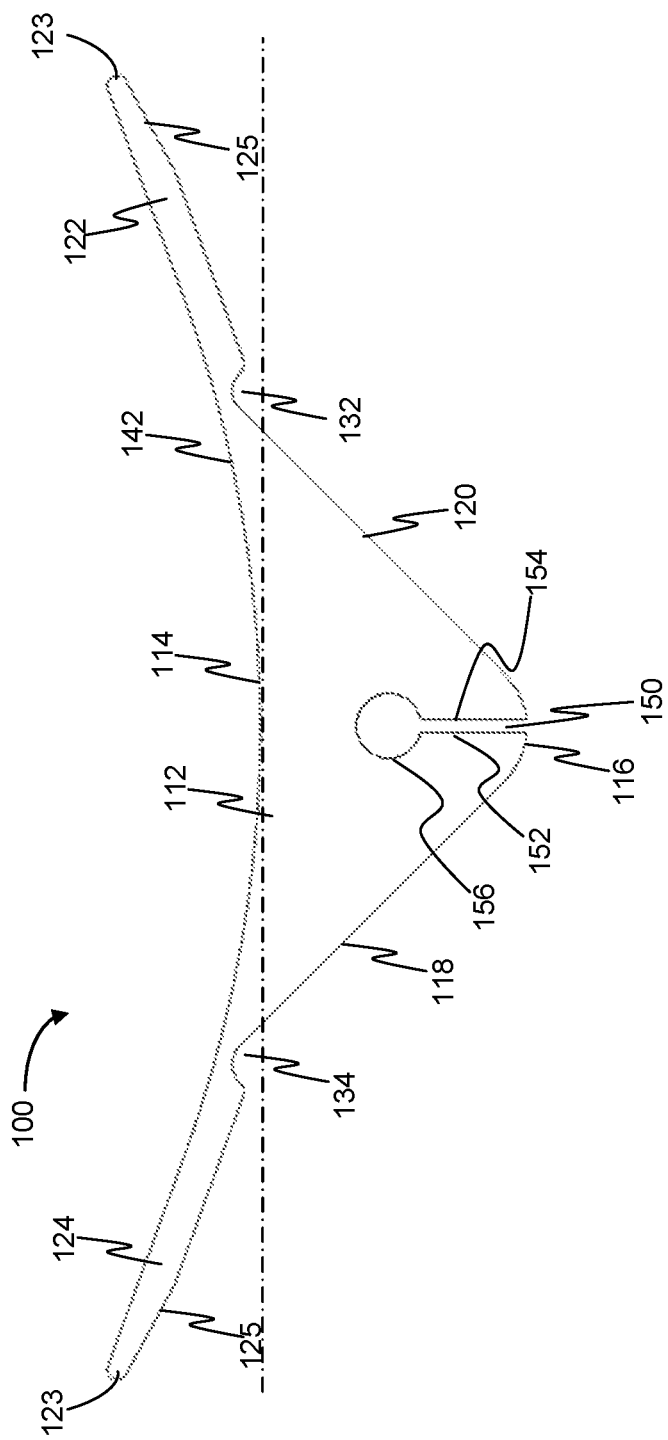

Referring to FIG. 8 another embodiment of trim piece 100 is depicted. Slit 150 is formed in body 112 of trim piece 100. Slit 150 is defined by left side 152, right side 154 and aperture 156. Aperture 156 is configured to accept insertion of, for example, a fiber or wire into aperture 156 to generally conceal the fiber or wire from view. Aperture 156 may accommodate one or more lengths of fiber or wire while remaining within the scope of the invention. In addition, the cross sectional profile of aperture 156 is circular in FIG. 8. However, the cross-sectional profile of aperture 156 may be square, rectangular, triangular, oval, elliptical, race track shaped or the shape of other regular or irregular polygons while remaining within the scope of the invention. Left side 152 and right side 154 of slit 150 can meet in close apposition or maintain a small gap therebetween. Slit 150 may be located proximate junction 116 or at another location on trim piece 100. Slit 150 may be located to be accessed from any location on the cross section of trim piece but a location proximate junction 116 conceals the location of slit 150 when trim piece is applied.

In operation, trim piece 100 is fitted into a corner between two walls, a wall and a floor, a wall and a cabinet, or other location where two substantially planar surfaces meet. Trim piece 100 can be oriented such that junction 116 rests proximate or against an inside corner and top cap 114 faces outwards. Hinge portions 132 and 134 enable increased flexibility of wing portions 122 and 124, thus enabling wing portions 122 124 to lay flat against each generally planar surface and to compensate for irregularities of the surfaces thus presenting a smooth and finished appearance to the inside corners with less effort than more conventional finishing techniques. Trim piece 100 can be held in place by an integrated adhesive, or by a user applied adhesive.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

The invention claimed is:

1. A trim piece for finishing inside corners, comprising:
    an elongated unitary structure of indeterminate length which when viewed in cross section, includes;
    a body presenting two angled interior surfaces that are angled relative to one another at an angle approximating an angular relationship of two surfaces forming an inside corner that is to be finished and an inside apex between the two angled interior surfaces;
    the body further presenting two outside portions including a first outside portion and a second outside portion;
    a first wing portion extending outwardly away from the first outside portion;
    a second wing portion extending outwardly away from the second outside portion;

a first hinge portion between the first wing portion and the first outside portion having a first cross section relatively thinner than the adjacent first wing portion and first outside portion; and a second hinge portion between the second wing portion and the second outside portion having a second cross section relatively thinner than the adjacent second wing portion and second outside portion wherein each the first hinge portion and the second hinge portion are bounded by a back surface having a radius of curvature that is 1.40 to 6 times a minimum thickness of the first hinge portion and the second hinge portion, respectively.

2. The trim piece as claimed in claim 1, wherein the radius of curvature is 10/7 of the minimum thickness of the first hinge portion and the second hinge portion.

3. The trim piece as claimed in claim 1, wherein the radius of curvature is 6 times of the minimum thickness of the first hinge portion and the second hinge portion.

4. The trim piece as claimed in claim 1, wherein at least one of the first wing portion and the second wing portion presents a rounded tip when viewed in cross section.

5. The trim piece as claimed in claim 1, wherein at least one of the first wing portion and the second wing portion presents a tapered portion when viewed in cross section.

6. The trim piece as claimed in claim 1, further comprising integrated lighting.

7. The trim piece as claimed in claim 6, wherein the integrated lighting comprises LEDs, fiber optics or low voltage wiring.

8. The trim piece as claimed in claim 1, wherein the trim piece defines an interior opening when viewed in cross section, the interior opening being accessible via a slit extending from the interior opening to an external surface of the trim piece.

9. A method of finishing an inside corner, the method comprising:
  placing a trim piece formed of an elongated unitary structure of indeterminate length into an inside corner such that two angled interior surfaces of a body of the trim piece are closely approximated to the inside corner, the two angled interior surfaces forming an inside apex between them and two outside portion including a first outside portion and a second outside portion;
  flexing a first wing portion extending outwardly from the first outside portion away from the inside corner by bending a first hinge portion that is located between the adjacent first wing portion and the first outside portion and having a first cross section relatively thinner than both the adjacent first wing portion and first outside portion;
  flexing a second wing portion extending outwardly from the second outside portion away from the inside corner by bending a second hinge portion that is located between the adjacent second wing portion and the second outside portion and having a second cross section relatively thinner than both the adjacent second wing portion and second outside portion;
  selecting the trim piece such that each the first hinge portion and the second hinge portion are bounded by a back surface having a radius of curvature that is 1.40 to 6 times a minimum of the first hinge portion and the second hinge portion, respectively; and
  securing at least one of the two angled interior surface of a body to the inside corner.

10. The method as claimed in claim 9, wherein the radius of curvature is 10/7 of the minimum thickness of the first hinge portion and the second hinge portion.

11. The method as claimed in claim 9, wherein the radius of curvature is 6 times the minimum thickness of the first hinge portion and the second hinge portion.

12. The method as claimed in claim 9, further comprising selecting the trim piece such that at least one of the first wing portion and the second wing portion presents a rounded tip when viewed in cross section.

13. The method as claimed in claim 9, further comprising selecting the trim piece such that the trim piece further comprises integrated lighting, fiber optics or wiring.

14. The method as claimed in claim 9, further comprising accessing an internal longitudinal opening in the trim piece via a slit and inserting fiber optics or wire into the internal longitudinal opening.

* * * * *